May 16, 1950      A. P. BUFFINGTON      2,507,488
MOUNTING MEANS FOR VARIABLE INDUCTANCE COILS
Filed June 28, 1949
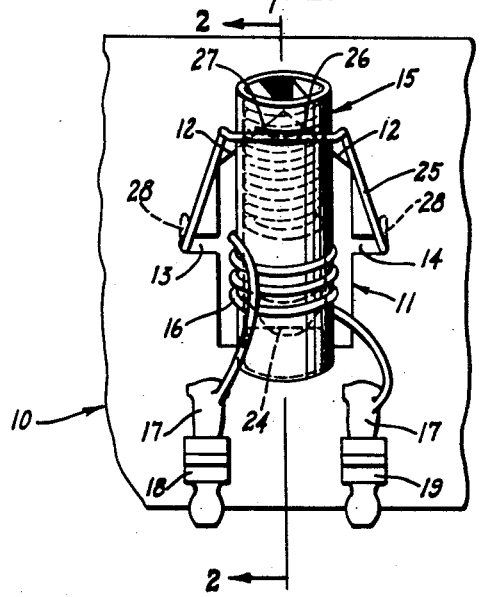
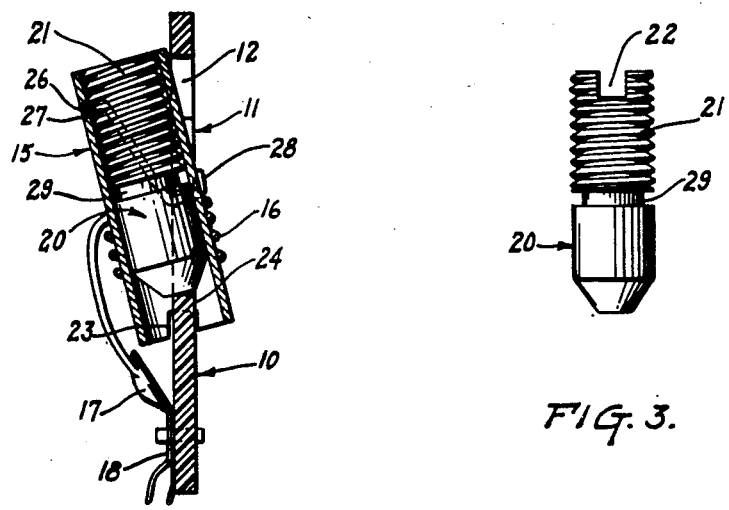
INVENTOR.
ALAN P. BUFFINGTON
BY
Brown, Denk & Synnestvedt
AGENTS Patented May 16, 1950

2,507,488

UNITED STATES PATENT OFFICE 2,507,488

MOUNTING MEANS FOR VARIABLE INDUCTANCE COILS

Alan P. Buffington, Philadelphia, Pa., assignor to Philco Corporation, Philadelphia, Pa., a corporation of Pennsylvania Application June 28, 1949, Serial No. 101,772

10 Claims. (Cl. 171—242)

1

The invention hereinafter described and claimed relates to tunable electrical circuit devices and, more particularly, is concerned with inductors adapted for operation at radio frequencies.

While of broader applicability, the apparatus of the invention is especially useful in the tuning of radio circuits such, for example, as the local oscillator stage, the antenna circuit, and the like.

The principal object of my invention is to provide a novel arrangement for adjustably supporting tunable electrical circuit devices, it being a further object to provide a tunable device, for example, an inductor, particularly adapted for such novel support.

Another object of the invention resides in the provision of a tunable inductor disposed in such novel combination with a supporting panel, or other structure, as to promote economical manufacture of radio apparatus and ready assembly thereof. In general, the apparatus of my invention is noteworthy for its inherent economy and for the ease with which the component parts thereof may be assembled or disassembled.

In the achievement of the foregoing objectives, together with others which will become clear as the description proceeds, there is provided: a tunable circuit device a portion of which is adapted to be inserted within an aperture formed in the mounting or supporting panel, which device includes an adjustable core or the like; and resilient means utilized to effect secure retention of the circuit device in assembled relation with the mounting panel, and serving also as a reaction point providing for adjustment of the aforementioned core member.

A representative embodiment of the invention may be clearly understood by consideration of the following detailed description, taken in conjunction with the accompanying drawing, in which:

Figure 1 is an elevational view of an adjustable inductor and of a fragmentary portion of a mounting panel, the view illustrating the manner in which the inductor is maintained in assembled relation with respect to the panel structure.

Figure 2 is a sectional view taken on the line 2—2 of Figure 1; and

Figure 3 is an elevational illustration of a type of core member preferably utilized in the practice of my invention.

Now making more particular reference to the figures of the drawing, and particularly to Figures 1 and 2 thereof, there is illustrated at 10 a fragmentary portion of a supporting sheet or panel,

2 it being understood that the complete panel may be of dimensions required to provide support for a plurality of tunable circuit devices. Preferably the panel is composed of electrical insulating material, certain well recognized resinous plastic substances being suitable for the purpose. The panel has formed therein an elongate aperture 11 which aperture is provided, toward one end thereof, with a pair of converging wall portions 12—12 and further having along each side edge thereof a slot or recess disposed substantially midway of the length of the aperture 11. These slots appear at 13 and 14 in Figure 1 and, as will later appear, are utilized in effecting releasable retention of an inductor, or other tunable circuit device, within the aperture 11.

As is clearly illustrated in Figure 2, the inductor, which is designated generally by the reference numeral 15, comprises a tubular base or form upon and externally of which are wound a suitable number of turns of wire, comprising a coil 16. The free ends of the wire are, of course, intended for connection with terminal structure of any desired type and, by way of illustration, said free ends have been connected, as by means of soldered joints shown at 17, to a pair of terminal lugs or members 18 and 19, which members are staked or otherwise secured to the mounting panel 10.

Interiorly of the coil form 15 there is disposed a core 20 which, as shown, takes the form of a plug movably mounted within the coil form to provide for adjustment of the inductance of the device. As clearly appears from Figures 2 and 3, the core or plug is of a diameter to fit snugly within the coil form, and the upper portion of said plug is threaded, as shown at 21, a tool-receiving slot 22 being provided in the upper end of the plug.

Insofar as the principles of the invention are concerned, the plug may be of any material effective to vary the inductance of the coil 16. For example, the plug may be of magnetic material such as finely comminuted iron, or may be of non-magnetic material (e. g., brass). The coil form may advantageously be fabricated of some relatively rigid insulating material such, for example, as the materials known commercially as kraft paper, or Bakelite.

The edge which defines the lower end of the tubular coil form is provided with a diametral slot 23 (Figure 2), which slot is of a width just sufficient to span the thickness of the mounting panel 10, thus serving to secure the lower end of the form to the panel. Preferably, and as shown at 24 in Figure 1, the lower edge of panel aperture 11 has a reentrant flange or lip of a width such that it may be received within the lower portion of the tubular coil form. This lip 24 serves primarily as a stop controlling movement of the plug inwardly of the core (the core member being illustrated in Figure 2 as in contact with this stop) and, further aiding in preventing undesirable rotary movement of the coil form with respect to the panel 10.

The upper, tapered end of the aperture 11, provided by the aforesaid converging wall portions 12—12, serves to align the coil form properly within the generally central portion of the aperture and provides two points of support for the upper end of the coil form. This support, in cooperation with the slotted interengagement between the lower end of the form and the lower edge of the aperture, securely positions the inductor as against twisting movements about its longitudinal axis.

Positive and releasable retention of the inductor is preferably effected through the agency of a resilient generally U-shaped member 25, the intermediate portion 26 thereof being received within an aperture 27 which takes the form of a slot extending about a portion of the circumference of the coil form and in the outwardly presented side of the latter. Each of the leg portions of resilient member 25 is provided with a hook 28, one of said hooks passing through slot 13 and the other extending through the slot 14, and both hooks bearing against the back of the panel 10. By virtue of the inherent resilience of the member 25, and the interengagement of hooks 28 with the panel structure, the intermediate portion 26 is urged resiliently toward the face of the panel 10.

In assembly of the apparatus, the diametral slot 23 is introduced across the lower wall of the aperture 11 with the lip 24 received within the tubular form, as above described. The legs of the spring member 25 are then sprung toward one another to permit entry of the hooks 28 within the open side of the adjacent slots 13 and 14. When thus engaged with the panel, the member 25 is permitted to move toward and into contact with the coil form, under the influence of the inherent resilience of said member. The parts are so shaped and proportioned that, as indicated above, the intermediate portion 26 of member 25 is received within the circumferential slot 27 in which position it bears against the threaded portion 21 of plug 20, thereby releasably retaining the coil form and further providing a reaction point accommodating adjustment movements of the plug axially of the coil form and of the winding carried thereby.

In accordance with an additional feature of this invention, the "inboard" end of threaded portion 21 of the plug is undercut, as at 29. The annular recess provided by such undercutting prevents inadvertent loss or removal of the core or plug from the tubular form, since rotational movements imparted to the core cannot effect retractive movement of the plug—that is movement outwardly of the coil form—beyond the position in which intermediate portion 26 of the resilient member 25 is received within the annular recess 29. To facilitate assembly, the nose of the plug is tapered, thus making it possible to insert the plug after the retaining spring member 25 has been mounted upon the panel and engaged within recess 27.

From the foregoing description it will be seen that the present invention provides a tunable circuit device novelly cooperable with mounting or supporting structure in such manner as greatly to simplify both the construction of the several components, and assembly thereof. It is particularly to be noted that although the arrangement is characterized by unusual simplicity, the resultant assembly is firm, eliminating any possibility of undesirable drift in the magnitude of the inductance, while yet accommodating ready and accurate adjustment thereof.

I claim:

1. In combination, a supporting panel or other structure having an aperture therein, a tunable electrical circuit device including a tubular element having a slot in one wall thereof and including core means mounted for reciprocatory movements within said element and past said slot, said tubular element having a retaining portion releasably engaged with a section of the wall defining said aperture, a wall portion of said tubular element overlying and bearing against a section of the wall of said aperture spaced from the section first mentioned, and resilient means bearing against said tubular element and reacting against said supporting panel in such manner as releasably to retain said element in assembled relation with said panel, said resilient means having a portion extending within said slot and bearing against said core means, whereby to retain said core means within said tubular element while accommodating reciprocatory movements of said core means.

2. A construction in accordance with claim 1, and in which said retaining portion comprises a second slot formed in the annular edge which defines one end of said tubular element and leading from said annular edge axially of said element.

3. In combination, a supporting structure having therein an elongated aperture defined by rectilinearly extending walls, a tunable electrical circuit device including a tubular element having a slot extending through the wall thereof and about a portion of the circumference of said element, a threaded core member disposed within said tubular element and adapted for reciprocatory movements therein past said slot, the annular edge defining one end of said tubular element having a portion configured for and disposed in demountable association with a wall of said aperture in a position such that a part of the tubular wall spaced from the said end extends across a wall of said aperture in a region spaced from the point of demountable association, and a spring member reacting against said supporting panel and overlying said tubular element, the inherent resilience of said member, in conjunction with the aforesaid demountable association, releasably retaining said electrical circuit device in association with the panel structure, a portion of said spring member extending within said slot into contact with the threads of said core member and constituting a reaction point provided for the reciprocatory movements of said core member in response to rotary movements imparted thereto.

4. In combination, panel structure having an aperture therein, a tunable electrical circuit device including a tubular element, the annular edge defining one end of said tubular element being provided with a slot extending inwardly from said edge and in the general direction of the longitudinal axis of said tubular element, said slot being disposed in engagement with a portion of the panel wall defining said aperture and said tubular element lying across said aperture in a position such that a side portion of said element is in bearing engagement with another edge portion of said aperture, and means releasably maintaining said bearing engagement.

5. In combination, panel structure having an aperture therein, a tunable electrical circuit device including a tubular element, the annular edge defining one end of said tubular element being provided with a slot extending inwardly from said edge and in the general direction of the longitudinal axis of said tubular element, said slot being disposed in engagement with a portion of the panel wall defining said aperture and said tubular element being so disposed that its longitudinal axis extends at an angle with respect to the plane of the panel, a side wall of said tubular element being disposed in bearing engagement with a wall portion of said aperture spaced across the aperture from the wall portion first mentioned, and resilient means reacting against said panel and bearing against said tubular element releasably to retain the same in assembled relation with respect to the panel.

6. A construction in accordance with claim 5, and further including threaded core means mounted for reciprocatory movements within the said tubular element, said tubular element having an aperture through the side wall thereof extending in a direction transverse to the longitudinal axis of said element, the construction being further characterized in that said resilient means comprises a spring a portion of which extends within the aperture provided in said tubular element into bearing engagement with the threads of said core means, whereby frictionally to retain said core means within the tubular element while accommodating reciprocatory movements of the latter.

7. A construction in accordance with claim 6, and in which said spring is of generally U-shape having free end portions engaged with the panel structure and an intermediate portion disposed in the stated engagement with the threads of said core means.

8. In a tunable inductor, a generally tubular coil form, and a core member disposed within said coil form with freedom for reciprocatory movements therein, the annular edge defining one end of said tubular element being provided with a slot extending inwardly from said edge and in the general direction of the longitudinal axis of said tubular element, and the wall of said tubular element being provided with an aperture disposed adjacent said core member.

9. In a tunable inductor, a generally tubular coil form, and a core member disposed within said coil form with freedom for reciprocatory movements therein, said core member being threaded from the region of one end thereof to a section disposed intermediate the ends thereof, said member further having an annular groove extending peripherally thereabout in adjacency to said section and a tool-receiving aperture disposed in one end thereof, said tubular coil form having an aperture formed in the wall thereof and extending about a portion of the circumference of said coil form in adjacency to the threads of said core member.

10. An inductor in accordance with claim 9, and further characterized in that said aperture is disposed toward one end of said tubular coil form, and in which the annular edge defining the opposite end of said coil form is provided with a reentrant portion adapted for releasable engagement with mounting structure.

ALAN P. BUFFINGTON.

REFERENCES CITED

The following references are of record in the file of this patent:

UNITED STATES PATENTS

| Number | Name | Date |
| --- | --- | --- |
| 1,643,319 | Seligman | Sept. 27, 1927 |
| 2,386,732 | Wohlhieter | Oct. 9, 1945 |
| 2,399,958 | Tinnerman | May 7, 1946 |